United States Patent
Markusch et al.

(12) 
(10) Patent No.: US 6,582,771 B1
(45) Date of Patent: Jun. 24, 2003

(54) METHOD FOR PRODUCING A POLYURETHANE/GEOFABRIC COMPOSITE

(75) Inventors: Peter H. Markusch, Sannibel, FL (US); Ralf Guether, Pittsburgh, PA (US); LeRoy Payne, Bayer Corporation, 100 Bayer Rd., Pittsburgh, PA (US) 15205-9741

(73) Assignees: Bayer Corporation, Pittsburgh, PA (US); Leroy Payne, Molt, MT (US)

( * ) Notice: Subject to any disclaimer, the term of this patent is extended or adjusted under 35 U.S.C. 154(b) by 0 days.

(21) Appl. No.: 10/138,995

(22) Filed: May 3, 2002

(51) Int. Cl.[7] ................................................ B05D 7/00
(52) U.S. Cl. .............................. 427/389.9; 427/393.4; 427/136
(58) Field of Search .............................. 427/136, 389.9, 427/393.4

(56) References Cited

U.S. PATENT DOCUMENTS

| | | | |
|---|---|---|---|
| 3,002,973 A | 10/1961 | Zaugg et al. ................ | 260/243 |
| 3,110,695 A | 11/1963 | Ceresa ....................... | 260/45.5 |
| 3,124,605 A | 3/1964 | Wagner ....................... | 260/453 |
| 3,152,162 A | 10/1964 | Fischer et al. .............. | 260/453 |
| 3,201,372 A | 8/1965 | Wagner ....................... | 260/77.5 |
| 3,277,138 A | 10/1966 | Holtschmidt et al. ........ | 260/453 |
| 3,304,273 A | 2/1967 | Stamberger ................. | 260/2.5 |
| 3,325,421 A | 6/1967 | Muller ........................ | 252/308 |
| 3,383,351 A | 5/1968 | Stamberger ................. | 260/33.2 |
| 3,394,164 A | 7/1968 | McClellan et al. .......... | 260/453 |
| 3,454,606 A | 7/1969 | Brotherton et al. ......... | 260/397.7 |
| 3,455,883 A | 7/1969 | Kamal et al. ................ | 260/77.5 |
| 3,492,330 A | 1/1970 | Trecker et al. .............. | 260/453 |
| 3,523,093 A | 8/1970 | Stamberger ................. | 260/2.5 |
| 3,567,763 A | 3/1971 | Emmons et al. ............. | 260/478 |
| 3,644,457 A | 2/1972 | Konig et al. ............ | 260/453 SP |
| 3,652,639 A | 3/1972 | Pizzini et al. ............. | 260/465.4 |
| 3,654,106 A | 4/1972 | Wagner et al. ......... | 204/159.23 |
| 3,808,250 A | 4/1974 | Blahak et al. ............ | 260/455 R |
| 3,823,201 A | 7/1974 | Pizzini et al. ................ | 260/861 |
| 3,975,428 A | 8/1976 | Blahak et al. ............... | 260/472 |
| 4,016,143 A | 4/1977 | Blahak et al. ......... | 260/77.5 AM |
| 4,042,537 A | 8/1977 | Dahm et al. ........... | 260/2.5 AP |
| 4,089,835 A | 5/1978 | Konig et al. ............... | 260/31.6 |
| 4,386,218 A | 5/1983 | Rasshofer et al. ............ | 554/38 |
| 4,390,645 A | 6/1983 | Hoffman et al. ............ | 521/137 |
| 4,454,730 A | 6/1984 | Gregory et al. ........... | 66/149 S |
| 4,456,730 A | 6/1984 | Balle et al. ................. | 524/839 |
| 4,472,568 A | 9/1984 | Rasshofer et al. ............ | 528/68 |

(List continued on next page.)

FOREIGN PATENT DOCUMENTS

| | | |
|---|---|---|
| DE | 1 230 778 | 12/1966 |
| GB | 848671 | 9/1960 |
| GB | 848867 | 9/1960 |
| GB | 878430 | 9/1961 |
| GB | 994890 | 6/1965 |

*Primary Examiner*—Erma Cameron
(74) *Attorney, Agent, or Firm*—Joseph C. Gil; John E. Mrozinski, Jr.

(57) ABSTRACT

The present invention is directed to a method for impregnating at least one geofabric with a liquid solidifiable polyurethane composition, conforming at least one polyurethane-impregnated geofabric to a surface (such as to the surface of a canal, ditch and/or pipe) and allowing the liquid solidifiable polyurethane composition to cure and form a polyurethane/geofabric composite. The liquid solidifiable polyurethane composition is the reaction product of COMPONENT A, COMPONENT B and COMPONENT C, as defined herein. COMPONENT C has the same equivalent weight as COMPONENT B and contains catalyst. One advantage of the present invention is that the ratio of COMPONENT B to COMPONENT C can be adjusted during processing without changing the isocyanate index. As a result, geltimes of liquid solidifiable polyurethane compositions of the present invention can be adjusted to accommodate changes in outdoor application temperature.

21 Claims, 4 Drawing Sheets

U.S. PATENT DOCUMENTS

| | | | |
|---|---|---|---|
| 4,501,873 A | 2/1985 | Rasshofer | 528/48 |
| 4,515,923 A | 5/1985 | Fauss et al. | 525/127 |
| 4,525,534 A | 6/1985 | Rasshofer | 525/127 |
| 4,540,720 A | 9/1985 | Rasshofer et al. | 521/159 |
| 4,565,645 A | 1/1986 | Rasshofer et al. | 252/182 |
| 4,578,500 A | 3/1986 | Rasshofer et al. | 560/25 |
| 4,594,199 A | 6/1986 | Thottathil | 260/502.4 R |
| 4,844,287 A * | 7/1989 | Long | 220/567.1 |
| 4,872,784 A | 10/1989 | Payne | 405/270 |
| 4,955,759 A | 9/1990 | Payne | 405/270 |
| 4,955,760 A | 9/1990 | Payne | 405/270 |
| 4,994,540 A | 2/1991 | Boerner et al. | 528/44 |
| 5,049,006 A | 9/1991 | Payne | 405/270 |
| 5,062,740 A | 11/1991 | Payne | 405/270 |
| 5,096,206 A * | 3/1992 | Andre et al. | 277/314 |
| 5,164,473 A | 11/1992 | Dormish et al. | 528/44 |
| 5,166,303 A | 11/1992 | Markusch et al. | 528/76 |
| 5,240,439 A | 8/1993 | Egenolf | 439/745 |
| 5,308,657 A | 5/1994 | Markusch et al. | 427/284 |
| 5,421,677 A | 6/1995 | Adam et al. | 405/270 |
| 5,607,998 A | 3/1997 | Markusch et al. | 524/494 |
| 5,639,331 A | 6/1997 | Payne | 156/242 |
| 5,770,673 A | 6/1998 | Markusch et al. | 528/61 |
| 6,187,832 B1 | 2/2001 | Leenslag | 521/155 |

* cited by examiner

3 Stream Method

"A", "B" and "C" Streams are Independently Introduced and Combined in a Single Mixer Ambient Temperature is Sensed and a valve Automatically Adjusts the Proper Amount of Part "C" into Mixer

METHOD FOR PRODUCING A POLYURETHANE/GEOFABRIC COMPOSITE

TECHNICAL FIELD OF THE INVENTION

The present invention relates to a method for impregnating at least one geofabric with a liquid solidifiable polyurethane composition, conforming at least one polyurethane-impregnated geofabric to a surface and allowing the liquid solidifiable polyurethane composition to cure to form a polyurethane/geofabric composite.

The present invention also relates to a method for lining a surface such as a ditch, canal and/or pipe by impregnating at least one geofabric with a liquid solidifiable polyurethane composition, conforming at least one polyurethane-impregnated geofabric to a surface and allowing the liquid solidifiable polyurethane composition to cure to form a polyurethane/geofabric composite.

Liquid solidifiable polyurethane compositions of the present invention have geltimes of from three to twenty minutes, despite changes in application temperature. Such geltimes allow an on-site user sufficient time to apply the polyurethane-impregnated geofabric to a surface before the liquid solidifiable polyurethane composition cures.

BACKGROUND OF THE INVENTION

Many countries throughout the world place a great deal of importance on the management of natural resources. Water conservation is one important part of managing natural resources.

Losses in the distribution of water due to the use of unlined irrigation ditches are estimated to be, at a minimum, 25% and, in some situations, more than 50%, depending upon the porosity of the ditch surface and the distance the water is moved. In most rural areas, ditches are formed by excavating the soil to a desired depth and width. Water moves through the ditch in contact with the exposed natural surface, i.e., sand, clay, rocks, etc. and. more commonly, mixtures thereof. The porosity of the ditch will not only depend upon the components of the surface of the ditch, but also on the proportion of the different materials present on the surface of the ditch.

The loss of water in unlined irrigation ditches at one time was considered acceptable because water supply exceeded demand. However, as civilization has developed and world population has increased, more water is required for both greater food production and for markedly increasing non-agriculture uses. In addition to greater domestic uses in sanitation, industry now employs large quantities of water in manufacturing and processing procedures.

Although conservation efforts have reduced water consumption to a degree, water is still in relatively short supply. Since cost effective conservation opportunities and readily accessible water supplies have already been developed, attention must be directed to improving the efficiency of water distribution systems.

Some ditches and canals have been lined with concrete and/or preformed concrete pipes, thereby improving the efficiency of these water distribution systems. While concrete is durable and long lasting (if properly used), it is expensive to install and finish. Additionally, concrete can be damaged by unfavorable temperatures during curing, is subject to frost damage, cracking and heaving, all of which can cause water leakage.

Processes for forming composite liners for canals and ditches and apparatuses for performing such processes are disclosed, for example, in U.S. Pat. Nos. 4,872,784; 4,955,759; 4,955,760; 5,049,006; 5,062,740; 5,421,677; 5,607,998; and 5,639,331.

U.S. Pat. No. 5,639,331 ("the '331 patent") discloses an apparatus for forming a continuous structure comprising a liquid reactive resin forming material, a particulate solid additive material and a porous blanket. The additive materials are continuously mixed with the liquid resin forming material in an amount significantly greater than that of the liquid resin forming material. Suitable liquid reactive resin forming materials disclosed in the '331 patent include thermosetting resins such as polyurethanes or polyesters. The apparatus of the '331 patent comprises multiple reservoirs, one of which can contain an isocyanate, another of which can contain a polyol. The apparatus disclosed in the '331 patent is used on-site in the fabrication of composite liners for irrigation canals.

The '331 patent further discloses that resin forming systems may utilize a resin forming material in one reservoir and a catalyst in a second reservoir. However, the '331 patent does not address the use of catalysts in two component, thermoset polyurethane formulations.

U.S. Pat. No. 5,421,677 ("the '677 patent") is directed to an improved process of forming a ditch liner. The mixture of the '677 patent comprises one or more fillers in an amount up to 60% by weight, based upon the total weight of the mixture. The mixture of the '677 patent is dispensed on a geotextile, thereby forming a liquid, filler-containing polyurethane soaked geotextile composite. The liquid polyurethane soaked geotextile composite is then placed over the surface of an area to be lined.

The '677 patent discloses a specific polyol composition comprising at least two different types of polyether polyols to be used in the formulation of the polyurethane/filler mixture. Additionally, the '677 patent discloses the use of polyurethane catalysts. As shown in the examples of the '677 patent, a desired amount of catalyst is added to the polyol composition prior to mixing with the isocyanate and filler components. The polyol composition of the '677 patent is well suited to be used as the liquid, reactive, resin-forming material of the '331 patent.

Those skilled in the art will recognize that a disadvantage of having a selected constant amount of catalyst contained in the polyol composition (such as is disclosed in the '677 patent) is that a desired geltime may only be achieved at a given temperature. For example, using an amount of catalyst in a polyol composition such as that disclosed in the '677 patent will result in a geltime of about ten minutes at 20° C. At 50° C., the geltime will be less than two minutes, while at 5° C. the geltime will be extended to more than thirty minutes.

In order to obtain a certain geltime at a given application temperature, the amount of catalyst would have to be varied according to temperature. This solution, however, would result in multiple polyol compositions containing different amounts of catalyst. This is undesirable not only from an economic point of view, but also from a practical point of view because the polyol component would have to be changed several times within a day when the temperature changes, such as, for example, when the temperature is 5° C. in the morning and then 25° C. in the afternoon.

Additionally, three-component systems for producing polyurethanes are known. For example, U.S. Pat. No. 6,187,832 ("the '832 patent") discloses a process for producing flexible polyurethane foams comprising preparing a rigid foam by feeding three components to a mixing head of a high pressure machine. One component is a polyisocyanate, another component is an isocyanate reactive component containing water and yet another component is another isocyanate reactive component.

The rigid foam of the '832 patent is prepared by using water as a blowing agent. However, other blowing agents can be used which react with the reactive mixture, thereby liberating a gas which causes the mixture to foam. Subsequently, the rigid foam is crushed to form a flexible foam which is then heated to temperatures between 70° C. and 200° C.

Although the '832 patent discloses using two polyol components combined in a mixhead with one polyisocyanate, the process as well as the final product of the '832 patent are different from the present invention. For example, the '832 patent discloses preferably using water as a blowing agent which causes the polyurethane composition to foam. Foaming is not desired in a process for producing a non-porous polyurethane/geotextile composite (the process disclosed by the present invention). Also, the two polyol compositions of the '832 patent have different equivalent weights, whereas the present invention discloses two polyol components having the same equivalent weight.

It is therefore desirable to develop a method for producing polyurethane-impregnated geofabrics wherein the on-site user is able to adjust the amount of isocyanate reactive components in a reactive mixture during temperature changes without changing the ratio of the isocyanate to the sum of the isocyanate reactive components.

SUMMARY OF THE INVENTION

The method of the present invention uses three components to form a liquid solidifiable polyurethane composition, i.e., a liquid polyisocyanate component (hereinafter referred to as COMPONENT A); a first isocyanate reactive component which does not contain catalyst (hereinafter referred to as COMPONENT B); and a second isocyanate reactive component which contains catalyst and which has the same equivalent weight as COMPONENT B (hereinafter referred to as COMPONENT C).

COMPONENT B and COMPONENT C are adjusted according to changes in outdoor application temperature. As a result, liquid solidifiable polyurethane compositions of the present invention have geltimes of from three to twenty minutes, despite changes in temperature.

As used herein, the term "geofabric" refers to a geotextile or to a geogrid and/or to a combination of both. "Geotextile" refers to any woven or non-woven porous blanket or mat which is produced from natural or synthetic fibers. "Geogrid" refers to any network of integrally connected polymeric material. Geotextiles are used primarily to line earthen surfaces. Such liners may also be used to line roofs, ponds, reservoirs, landfills, underground storage tanks, canals and ditches.

Examples of geotextiles and geogrids include woven or non-woven polypropylene, polyester, jute and cotton fabrics. Any of the known geotextiles may be used in the present invention.

DETAILED DESCRIPTION OF THE INVENTION

Figure 1A:
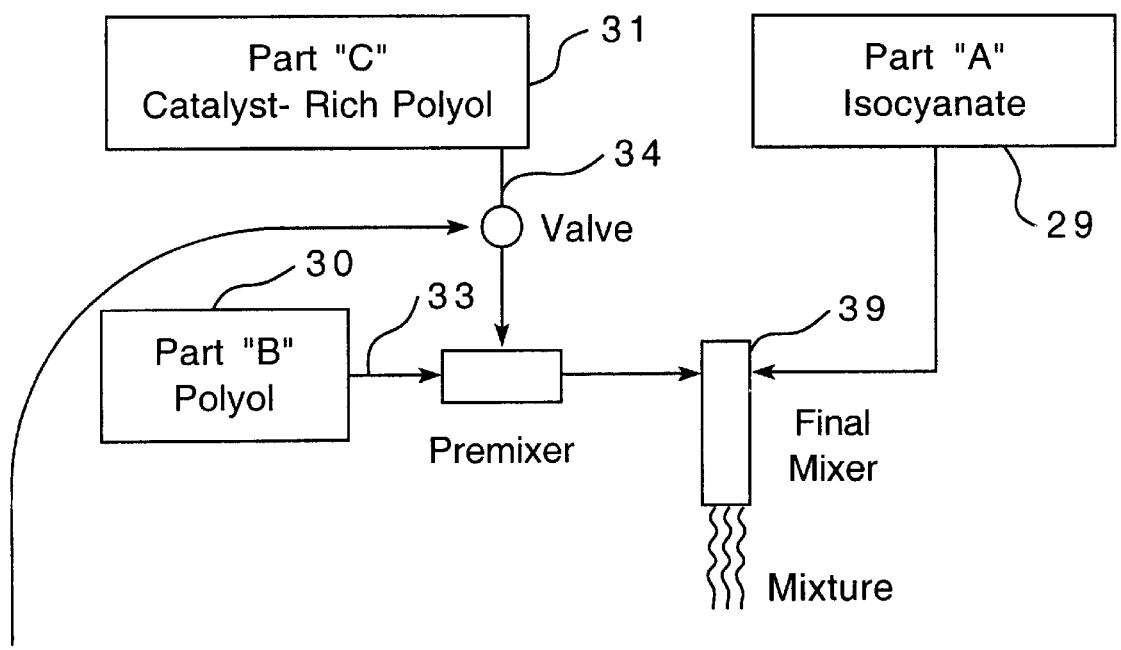
FIG. 1A is a schematic block drawing of one method for combining COMPONENT A, COMPONENT B AND COMPONENT C, wherein COMPONENT B and COMPONENT C are combined before being mixed with COMPONENT A.

The present invention relates to a method for producing a polyurethane/geofabric composite in which at least one geofabric is impregnated with a liquid solidifiable polyurethane composition.

The liquid solidifiable polyurethane composition of the present invention is the reaction product of a mixture comprising: COMPONENT A; COMPONENT B, wherein COMPONENT B optionally further comprises: Bi) 0–10% by weight, based on the total weight of COMPONENT B, of one or more low molecular weight diols or triols having hydroxyl equivalent weights of from about 31 to 99; and Bii) 0–10% by weight, based on the total weight of COMPONENT B, of a compound containing at least two amine groups; and COMPONENT C, wherein COMPONENT C optionally further comprises: Ci) 0–10% by weight, based on the total weight of COMPONENT C, of one or more low molecular weight diols or triols having hydroxyl equivalent weights of from about 31 to 99; and Cii) 0–10% by weight, based on the total weight of COMPONENT C, of a compound containing at least two amine groups, wherein COMPONENT B and COMPONENT C are used in a mix ratio such that a geltime of from three to twenty minutes at a temperature between 40° C. and 50° C. is achieved.

The polyurethane-impregnated geofabric(s) is conformed to a surface. The liquid solidifiable polyurethane composition cures and forms a polyurethane/geofabric composite.

Liquid solidifiable polyurethane compositions of the present invention have geltimes of from three to twenty minutes despite changes in application temperature. Such geltimes allow an on-site user sufficient time to apply the polyurethane-impregnated geofabric to a surface before the liquid solidifiable polyurethane composition cures.

The relative ratios of COMPONENT B and COMPONENT C are adjusted according to changes in outdoor application temperature. For example, at low outdoor temperatures, an increased amount of COMPONENT C is used to form the liquid solidifiable polyurethane composition, while at high outdoor temperatures, a decreased amount of COMPONENT C is used to form the liquid solidifiable polyurethane composition. The sum of COMPONENT B and COMPONENT C, however, remains the same despite changes in outdoor temperature.

Any of the known liquid polyisocyanates may be used as COMPONENT A in the present invention. Suitable liquid organic polyisocyanates include aliphatic, cycloaliphatic, araliphatic, aromatic and heterocyclic polyisocyanates. Such isocyanates include those represented by the formula $Q(NCO)_n$, in which n represents a number from 2 to about 5, preferably, 2 to 3 and Q represents an aliphatic hydrocarbon group containing from 2 to about 18, preferably, from 6 to 10 carbon atoms, a cycloaliphatic hydrocarbon group containing from 4 to about 15, preferably, from 5 to 10 carbon atoms, an araliphatic hydrocarbon group containing from 8 to 15, preferably, from 8 to 13 carbon atoms, or an aromatic hydrocarbon group containing from 6 to about 15, preferably, from 6 to 13 carbon atoms.

Examples of suitable polyisocyanates include the following: ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and 1,4-diisocyanate and mixtures thereof; 1-isocyanato-3,3,5-trimethyl-isocyanatomethylcyclohexane; 2,4- and 2,6-hexahydrotoluene diisocyanate; dicyclohexylmethane-4,4'-diisocyanate ("hydrogenated MDI" or "HMDI"); 2,4- and 2,6-toluene diisocyanate ("TDI") and mixtures thereof; diphenylmethane-2,4'- and/or -4,4'-diisocyanate ("MDI"); polymethylene poly(phenylisocyanates) of the kind which may be obtained by condensing aniline with formaldehyde followed by phosgenation ("crude MDI") and which are described in British Patent Nos. 878,430 and 848,671; norbornane diisocyanates as described in U.S. Pat. No. 3,492,330, the teachings of which are incorporated herein by reference; m- and p-isocyanatophenyl sulfonylisocyanates as described in U.S. Pat. No. 3,454,606, the teachings of which are incorporated herein by reference; perchlorinated aryl polyisocyanates as described in U.S. Pat. No. 3,227,138, the teachings of which are incorporated herein by reference; modified polyisocyanates containing carbodiimide groups as described in U.S. Pat. No. 3,152,162, the teachings of which are incorporated herein by reference; modified polyisocyanates containing urethane groups as described in U.S. Pat. Nos. 3,394,164 and 3,644,457, the teachings of which are incorporated herein by reference; modified polyisocyanates containing allophanate groups as described in British Patent 994,890; modified polyisocyanates containing isocyanurate groups as described in U.S. Pat. No. 3,002,973, the teachings of which are incorporated herein by reference; modified polyisocyanates containing urea groups as described in German Patent No.1,230,778; polyisocyanates containing biuret groups as described in U.S. Pat. Nos. 3,124,605 and 3,201,372, the teachings of which are incorporated herein by reference; polyisocyanates obtained by telomerization reactions as described in U.S. Pat. No. 3,654,106, the teachings of which are incorporated herein by reference; polyisocyanates containing ester groups as described in U.S. Pat. No. 3,567,763, the teachings of which are incorporated herein by reference; reaction products of the above-mentioned isocyanates with acetals as described in German Patent No. 1,072,385; and polyisocyanates containing polymeric fatty acid groups as described in U.S. Pat. No. 3,455,883, the teachings of which are incorporated herein by reference.

It is also possible to use the isocyanate-containing distillation residues accumulated in the production of isocyanates on a commercial scale, optionally, in solution in one or more of the polyisocyanates mentioned above. It is also possible to use mixtures of the polyisocyanates described above.

In general, it is preferred to use readily available polyisocyanates such as, for example, TDI, MDI, polymethylene poly-(phenylisocyanates) of the type obtained by condensing aniline with formaldehyde followed by phosgenation ("crude MDI"), and polyisocyanates containing carbodiimide groups, urethane groups, allophanate groups, isocyanurate groups, urea groups or biuret groups ("modified polyisocyanates"). More preferably, the commercially available phosgenation products of aniline/formaldehyde condensates are used in the present invention.

Preferred polyisocyanates are liquid polyisocyanates having isocyanate group contents of from about 10 to 50% by weight, preferably, from 30 to 35%, most preferably, from 30 to 33% by weight, based on the total weight of the polyisocyanate. It is generally preferred that the polyisocyanates used in the present invention have a viscosity of less than 10,000 mPa·s at 25° C.

It is also preferred that the polyisocyanates used in the present invention be non-volatile at ambient temperature. More preferred polyisocyanates useful in the present invention are polymethylene poly-(phenylisocyanates) having NCO contents of from 15 to 33.5% by weight, preferably 30 to 33% by weight, based on the total weight of the polyisocyanate, with viscosities of from 20 to 3,000 mpa·s at 25° C. and liquid adducts of such polyisocyanates which have been made with polyols.

COMPONENT B comprises one or more hydroxyl group containing compounds having from about 2 to about 6 hydroxyl groups having a number average molecular weight of from at least 250 to about 8,000, preferably, from about 400 to about 4,000.

COMPONENT B optionally further comprises: Bi) 0–10% by weight, based on the total weight of COMPONENT B, of one or more low molecular weight diols or triols having hydroxyl equivalent weights of from about 31 to 99; and Bii) 0–10% by weight, based on the total weight of COMPONENT B, of a compound containing at least two amine groups, preferably a diamine, polyamine, amine terminated polyether and/or a combination thereof.

Liquid solidifiable polyurethane compositions of the present invention comprise from about 30–98% by weight, preferably, from about 70–98% by weight, more preferably, from about 90–98% by weight, based on the total weight of COMPONENT B and COMPONENT C, of COMPONENT B.

COMPONENT C comprises one or more hydroxyl group containing compounds having from about 2 to about 6 hydroxyl groups having a number average molecular weight of from at least 250 to about 8,000, preferably, from about 400 to about 4,000 and 0.01 to 1%, preferably, 0.05 to 0.08%, more preferably, 0.1 to 0.5% by weight based on the total weight of COMPONENT B and COMPONENT C, of an organo-metal catalyst, preferably an organo-tin catalyst.

COMPONENT C optionally further comprises: Ci) 0–10% by weight, based on the total weight of COMPONENT C, of one or more low molecular weight diols or triols having hydroxyl equivalent weights of from about 31 to 99; Cii) 0–10% by weight, based on the total weight of COMPONENT C, of a compound containing at least two amine groups, preferably a diamine, polyamine, amine terminated polyether and/or a combination thereof.

Liquid solidifiable polyurethane compositions of the present invention comprise from about 2–70% by weight, preferably, from about 2–30% by weight, more preferably, from about 2–10% by weight, based on the total weight of COMPONENT B and COMPONENT C, of COMPONENT C.

Suitable hydroxyl group containing compounds useful in the present invention include those organic compounds having number average molecular weights of from 250 to 8,000, preferably, from about 400 to about 4,000 and containing from 2 to 6 hydroxyl groups. These compounds include, for example, polyethers, polyesters, polythioethers, polyacetals and polycarbonates. Preferred compounds include one or more polyether polyols containing from 2 to 6 isocyanate-reactive groups having molecular weights of from 400 to 4,000.

Examples of suitable polyether polyols useful in the present invention include polyethers prepared, for example, by the polymerization of epoxides such as ethylene oxide, propylene oxide, butylene oxide, tetrahydrofuran, styrene oxide and epichlorohydrin, optionally, in the presence of Lewis acids such as $BF_3$ or prepared by chemical addition of such epoxides, optionally, added as mixtures or in sequence to starting compounds containing reactive hydrogen atoms such as water, alcohols or amines.

Examples of suitable starting compounds include ethylene glycol, 1,3- or 1,2-propanediol, 1,2-, 1,3- or 1,4-butanediol, trimethylolpropane, 4,4'-dihydroxydiphenylpropane, aniline, ammonia, ethanolamine and ethylene diamine. Sucrose polyethers may also be used in the present invention. Polyethers which predominantly contain primary hydroxyl groups (up to about 90% by weight, based on the total weight of the hydroxyl groups in the polyether) are also suitable for use in the present invention.

Polyethers modified by vinyl polymers of the kind obtained, for example, by the polymerization of styrene and acrylonitrile in the presence of polyethers (as described in U.S. Pat. Nos. 3,383,351, 3,304,273, 3,523,093 and 3,110,695, the teachings of which are incorporated herein by reference) are also suitable for use in the present invention, as are polybutadienes containing hydroxyl groups.

Preferred polyether polyols useful in the present invention include polyoxyalkylene polyether polyols, such as polyoxypropylene diol, polyoxybutylene diol and polytetramethylene diol, as well as polyoxypropylene polyoxyethylene diols and triols.

Further examples of polyether polyols suitable for use in the present invention include the so-called "PHD polyols" which are prepared by reacting an organic polyisocyanate, a hydrazine and a polyether polyol. Such polyols are described in U.S. Pat. Nos. 3,325,421, 4,042,537 and 4,089,835, the teachings of which are incorporated herein by reference.

Additional examples of polyether polyols suitable for use in the present invention include the so-called "polymer polyols" which are prepared by polymerizing styrene and acrylonitrile in the presence of a polyether. Such preparations are described in U.S. Pat. Nos. 3,383,351, 3,304,273, 3,523,093, 3,652,639, 3,823,201 and 4,390,645, the teachings of which are incorporated herein by reference. More preferred polyethers useful in the present invention are polyoxypropylene polyethers which do not contain ethylene oxide units.

Optionally, one or more organic low molecular weight diols or triols is used in the present invention. Suitable organic low molecular weight diols or triols useful in the present invention include, for example, diols and triols having equivalent weights of about 31 to 99 and number average molecular weights of less than 250. These compounds include, for example, 2-methyl-1,3-propanediol, ethylene glycol, 1,2- and 1,3-propanediol, 1,3- and 1,4- and 2,3-butanediol, 1,6-hexanediol, 1,10-decanediol, diethylene glycol, triethylene glycol, tetraethylene glycol, dipropylene glycol, tripropylene glycol, glycerol, trimethylolpropane, neopentyl glycol, cyclohexanedimethanol and 2,2,4-trimethylpentane-1,3-diol. Preferred diols and triols are dipropyleneglycol and tripropylene glycols.

Optionally, a compound containing at least two amine groups is used in the present invention. Suitable amine compounds useful in the present invention include, for example, aliphatic, cycloaliphatic or aromatic diamines. Preferred diamines have a molecular weight in the range of from about 62 to 400. Although any isocyanate-reactive diamine can be used in the present invention, the preferred isocyanate-reactive amines are aliphatic, cycloaliphatic or aromatic diamines having only primary amino groups. More preferred diamines are aliphatic or cycloaliphatic diamines such as ethylene diamine, hexamethylenediamine, bis(4-aminocyclohexyl)methane and 1-amino-3,3,5-trimethyl-5-aminomethylcyclohexane ("IPDA"). A most preferred diamine is bis(4-aminocyclohexyl)methane.

Aromatic diamines can be used in the present invention. Typical aromatic diamines have number average molecular weights of from about 108 to about 400 and preferably contain exclusively aromatically bound primary or secondary (preferably primary) amino groups. The aromatic diamines preferably have alkyl substituents in at least one position ortho to the amino groups. In particular, such aromatic diamines preferably have at least one $C_1$–$C_3$ alkyl substituent located ortho to one of the amino groups and two $C_1$–$C_3$ alkyl substituents located ortho to the other amino group, especially with an ethyl, propyl and/or isopropyl substituent in at least one such ortho position and methyl substituents optionally present in the other ortho positions. Mixtures of such aromatic diamines are also useful in the present invention.

Suitable aromatic diamines include 2,4-diaminomesitylene, 1,3,5-triethyl-2,4-diaminobenzene, 1,3,5-triisopropyl-2,4-diaminobenzene, 1-methyl-3,5-diethyl-2,4-diamino-mesitylene, 1-methyl-3,5-diethyl-2,6-diaminobenzene, 4,6-dimethyl-2-ethyl-1,3-diaminobenzene, 3,5,3',5'-tetraethyl-4,4-diamino-diphenylmethane, 3,5,3',5'-tetraisopropyl-4,4'-diaminodiphenylmethane and 3,5-diethyl-3',5'-diisopropyl-4,4'-diaminodiphenylmethane.

Other suitable aromatic diamines useful in the present invention include 1,4-diaminobenzene, 2,4-diaminotoluene, 2,4'- or 4,4'-diaminodiphenylmethane, 3,3'-dimethyl-4,4'-diaminodiphenylmethane, 4,4'-diaminodiphenyl propane-(2, 2), t-butyl toluene diamine, 1-methyl-3,5-bis-(methylthio)-2,4- or -2,6-diaminobenzene, and mixtures of such diamines. Preferred aromatic diamines include 1-methyl-3,5-diethyl-2,4-diamino-benzene, either alone or as a mixture with 1-methyl-3,5-diethyl-2,6-diaminobenzene.

Suitable isocyanate-reactive amines useful in the present invention contain both hydroxyl and amino groups. Mixtures of such compounds with the compounds mentioned above are also suitable.

Other suitable amine compounds include polyethers terminated with aromatic amino groups, the so-called "amine terminated polyethers" containing aromatically bound primary or secondary (preferably primary) amino groups. Compounds containing amino end groups can also be attached to the polyether chain through urethane, ester or ether groups. These aromatic amine terminated polyethers can be prepared by any of the methods known in the art.

In one method for preparing aromatic amine terminated polyethers, relatively high molecular weight polyether polyols can be converted into an amine terminated polyether. Methods for producing polyethers containing aromatic amino end groups are disclosed in U.S. Pat. Nos. 3,808,250, 3,975,428 and 4,016,143, the teachings of which are incorporated herein by reference.

Relatively high molecular weight compounds containing amino end groups may also be obtained according to U.S. Pat. No. 3,865,791, the teachings of which are incorporated herein by reference, by reacting isocyanate prepolymers based on polyhydroxyl polyethers with hydroxyl-containing enamines, aldimines or ketimines and hydrolyzing the reaction product.

Preferred aromatic amine terminated polyethers useful in the present invention include aminopolyethers obtained by the hydrolysis of compounds containing isocyanate end groups. Particularly preferred amine terminated polyethers are prepared by hydrolyzing an aromatic isocyanate compound having an isocyanate group content of from 0.5 to 40% by weight, based on the total weight of the isocyanate. The most preferred of such polyethers are prepared by first reacting a polyether containing two to four hydroxyl groups with an excess of an aromatic polyisocyanate to form an isocyanate terminated prepolymer and then converting the isocyanate groups to amino groups by hydrolysis.

Processes for the production of useful amine terminated polyethers using isocyanate hydrolysis techniques are described in U.S. Pat. Nos. 4,386,218, 4,454,730, 4,472,568, 4,501,873, 4,515,923, 4,525,534, 4,540,720, 4,578,500 and 4,565,645, the teachings of which are incorporated herein by reference.

Other suitable amine terminated polyethers include aminophenoxy-substituted polyethers which are described in European Patent Application Nos. 0288825 and 0268849.

Diamines, polyamines and amine-terminated polyethers can be used alone or combination. Preferably, these amines are combined with the other isocyanate reactive compounds prior to mixing with the isocyanate.

Organo-metal catalysts are used in the present invention for catalyzing the reaction between isocyanate groups and hydroxyl groups. Such catalysts are well known in the art and are generally used in an amount from about 0.01 to 1% by weight, based on the total weight of COMPONENT B and COMPONENT C.

Preferred catalysts are organic tin compounds. The organic tin compounds are preferably tin(II) salts of a carboxylic acid such as tin(II) acetate, tin(II) octoate, tin (II) ethyl hexoate and tin (II) laurate and tin (IV) compounds such as dibutyl tin oxide, dibutyl tin dichloride, dibutyl tin diacetate, dibutyl tin dilaurate, dibutyl tin maleate, dioctyl tin diacetate and the like. One preferred catalyst useful in the present invention is a dimethyltin dilaurate catalyst sold under the tradename FOMREZ UL-28 by Witco Corp., New York, N.Y.

COMPONENT B and COMPONENT C are preferably the same, however, any of the above-listed isocyanate-reactive materials may be used as COMPONENT B or COMPONENT C, provided that the equivalent weights of each of COMPONENT B and COMPONENT C are the same.

In one embodiment of the present invention, the polyurethane-impregnated geofabric is made with a machine such as that described in the '331 patent. One reservoir of the '331 patent contains COMPONENT A, a second reservoir contains COMPONENT B and a third reservoir contains COMPONENT C.

Figure 1B:
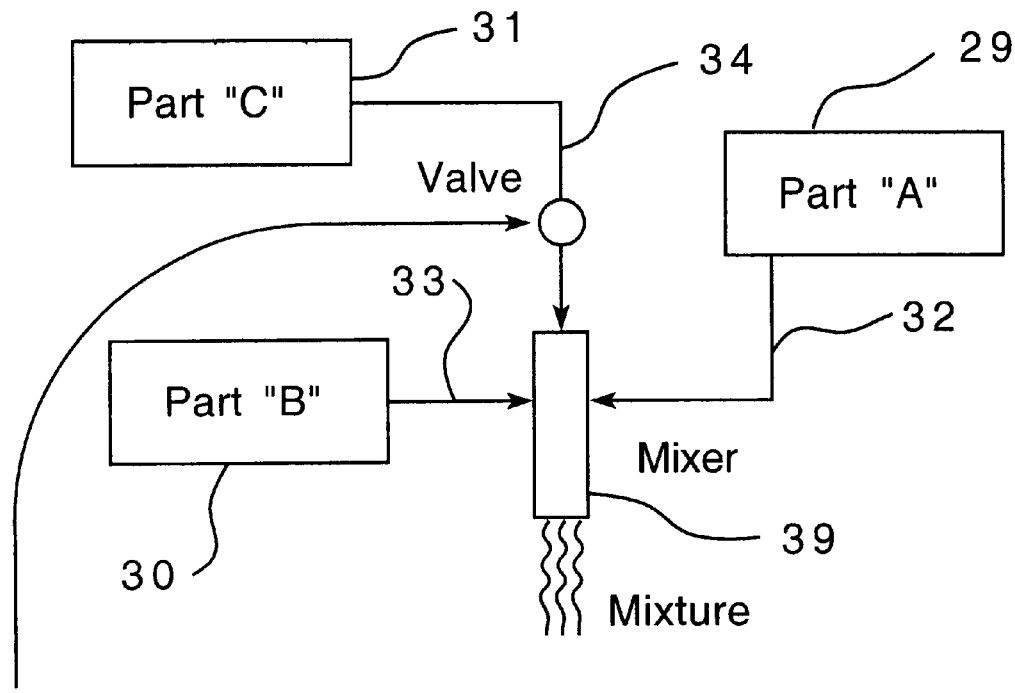
FIG. 1B is a schematic block drawing of another method for combining COMPONENT A, COMPONENT B and COMPONENT C of the present invention, wherein COMPONENT A, COMPONENT B and COMPONENT C are each independently introduced into a mixer.

Referring to FIG. 1 of the '331 patent and to FIG. 1B of the present application, in one embodiment of the present invention, COMPONENT A advances from reservoir 29 through conduit 32 to mixing chamber 39. COMPONENT B advances from reservoir 30 through conduit 33 into mixing chamber 39. COMPONENT C advances from reservoir 31 through conduit 34 into mixing chamber 39.

Referring to FIG. 1 of the '331 patent as well as to FIG. 1A of the present invention, in another embodiment of the present invention, COMPONENT A advances from reservoir 29 through conduit 32 to mixing chamber 39. COMPONENT B advances from reservoir 30 through conduit 33 into a pre-mixing chamber. COMPONENT C advances from reservoir 31 through conduit 34 into a pre-mixing chamber. In the pre-mixing chamber, COMPONENT B mixes with COMPONENT C. The resulting reactive mixture then advances to mixing chamber 39 for mixing with COMPONENT A. The resulting liquid solidifiable polyurethane composition can optionally be mixed with particulate solid additive or applied as such to one or more geofabrics.

Referring again to FIG. 1 of the '331 patent, the liquid solidifiable polyurethane composition is then delivered onto geofabric 54 as it advances over tray member 59 to form a polyurethane-impregnated geofabric. With barrier member 56 adjacent to geofabric 54 and disposed transversely across, a pool 69 of the liquid mixture collects behind barrier member 56. As geofabric 54 advances under barrier member 56, excess mixture is removed and a substantially uniform pre-selected thickness is retained on geofabric 54. Thereafter, part of the liquid solidifiable polyurethane composition is allowed to migrate through geofabric 54 to form a polyurethane-impregnated geofabric.

Figure 2:
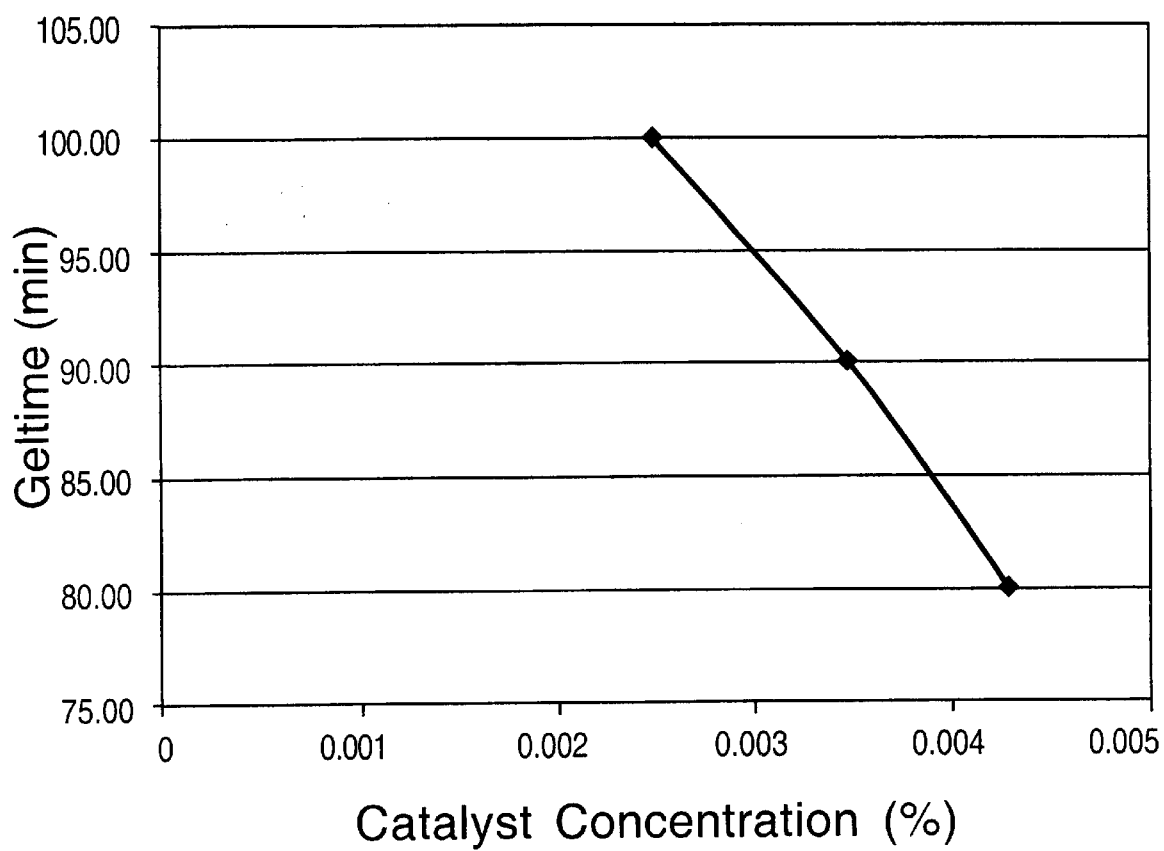
FIG. 2 is a graph which plots catalyst concentration in the reactive mixture of Example 1 necessary to achieve a geltime of ten minutes at various outdoor temperatures.

Referring now to FIG. 2 of the '331 patent, cutter member 65 cuts to size the polyurethane-impregnated geofabric. The polyurethane-impregnated geofabric is subsequently placed on a surface where it conforms to that surface and cures to form a polyurethane/geofabric composite.

If additional layers of polyurethane/geofabric composite are desired, any of the above processes can be repeated. For example, polyurethane-impregnated geofabrics may be applied over one another to form a layered polyurethane/geofabric composite having high strength and dimensional stability. Preferably, layered polyurethane/geofabric composites are used for lining earthen canals and ditches.

The thickness of the polyurethane/geofabric composite can be varied over a wide range but usually measures from about 50 microns to about 500 microns.

The amount of polyurethane applied to the geofabric(s) can be varied but usually the amount of polyurethane applied per square meter of geofabric is from 1 kg to 20 kg, preferably, from 2 kg to 5 kg.

One advantage of the present invention is that the amount of COMPONENT B as well as the amount of COMPONENT C can be adjusted as needed (e.g., for changes in temperature) during operation to obtain a desired geltime of from three to twenty minutes without changing the total amount of isocyanate reactive groups in relation to the isocyanate, i.e., the same NCO index is maintained. This advantage decreases the amount of lost production time and material due to changeover and the re-formulation of isocyanate reactive component with a different catalyst level experienced with previous systems.

The invention is further illustrated but is not intended to be limited by the following Example in which all parts and percentages are by weight unless otherwise specified.

EXAMPLE 1

| | |
|---|---|
| Isocyanate: | polymethylene poly (phenylisocyanate) having an NCO content of about 31.5%, a functionality of 2.8 and a viscosity at 25° C. of 200 mPa · s. |
| Polyol 1: | a monoethanolamine-started propylene oxide polyether polyol, having an OH number of about 350, a functionality of about 3 and a number average molecular weight of about 480. |

-continued

| | |
|---|---|
| Polyol 2: | a glycerin-started propylene oxide polyether polyol, having an OH number of about 250, a functionality of about 3 and a number average molecular weight of about 670. |
| Polyol 3: | a propylene glycol started propylene oxide having an OH number of 56, a functionality of about 2 and a molecular weight of about 2000. |
| Amine 1: | bis(4-aminocyclohexyl)methane, commercially available as PACM-20 from Air Products, Allentown, Pennsylvania. |
| Catalyst: | dimethyltin dilaurate, commercially available as FOMREZ UL-28 from Witco, New York, N.Y. |

The following polyol blend was used in the Example:
10 pbw Polyol 1
45 pbw Polyol 2
44.25 pbw Polyol 3
0.75 pbw Amine 1
Determination of Geltime 100 g of the polyol blend identified above was added to 43.58 g of Isocyanate. The reactive mixture was thoroughly mixed for 30 seconds and then poured into the aluminum cup of a GARDCO Hot Pot Geltimer (available from the Paul N. Gardner Company, Inc., Pompano Beach, Fla.). A constant surface temperature of 100° F. was set around the aluminum cup by a thermostat control. A wire stirrer was inserted into the aluminum cup with the hook placed in the drive shaft hole. A toggle switch started the geltimer and the stirrer motor. The geltimer is designed to run until the viscosity of the resin increases to a point where the drag exceeds the torque of the motor. The motor then stalled, stopping the clock counter and activating a flashing red light which signals the end of the test. 30 seconds was added to the time displayed on the geltimer to yield the actual geltime of the resin.

FIG. 2 illustrates a plot of the catalyst concentration in the above-described reactive mixture at various outdoor temperatures necessary to achieve a geltime of ten minutes.

Figure 3:
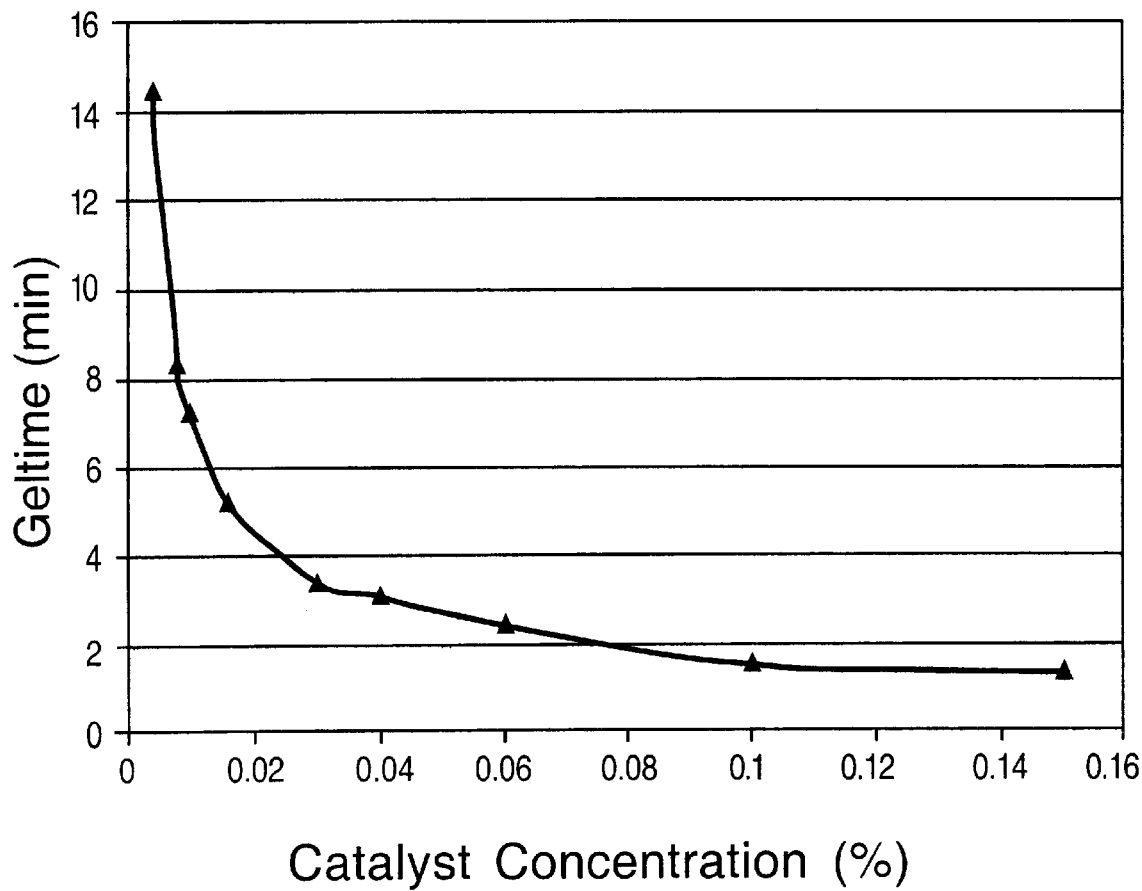
FIG. 3 is a graph which plots catalyst concentration in the reactive mixture of Example 1 at constant temperature versus geltime.

FIG. 3 illustrates a plot of the catalyst concentration in the above-described reactive mixture at constant temperature versus geltime.

Determining the dependency of catalyst concentration in relation to geltime at given outdoor temperatures allows the operator to adjust the ratio of COMPONENT B in relation to COMPONENT C to obtain a desired geltime of from three to twenty minutes at various outdoor temperatures.

For example, if the outdoor temperature is 35° C. (95° F.) and COMPONENT C has a catalyst concentration of 0.1%, to obtain a geltime of ten minutes, the ratio of COMPONENT C to COMPONENT B is 3:97. If the catalyst concentration in COMPONENT C is lowered to 0.01%, to obtain a geltime of ten minutes at an outdoor temperature of 35° C. (95° F.), the ratio of COMPONENT C in relation to COMPONENT B is 30:70.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method for producing a polyurethane/geofabric composite comprising:
    (1) impregnating at least one geofabric with a liquid solidifiable polyurethane composition which is the reaction product of a mixture comprising:
        COMPONENT A: a liquid polyisocyanate;
        COMPONENT B: a first isocyanate reactive component which does not contain catalyst, optionally, further comprising: Bi) 0–10% by weight, based on the total weight of COMPONENT B, of one or more low molecular weight diols or triols having hydroxyl equivalent weights of from about 31 to 99; and Bii) 0–10% by weight, based on the total weight of COMPONENT B, of a compound containing at least two amine groups; and
        COMPONENT C: a second isocyanate reactive component which has the same equivalent weight as COMPONENT B comprising 0.01 to 1% by weight, based on the total weight of COMPONENT B and COMPONENT C, of an organo-metal catalyst, optionally, further comprising: Ci) 0–10% by weight, based on the total weight of COMPONENT C, of one or more low molecular weight diols or triols having hydroxyl equivalent weights of from about 31 to 99; and Cii) 0–10% by weight, based on the total weight of COMPONENT C, of a compound containing at least two amine groups;
        wherein COMPONENT B and COMPONENT C are used in a mix ratio such that a geltime of from three to twenty minutes at a temperature between 4° C. and 50° C. is achieved;
    (2) conforming at least one polyurethane-impregnated geofabric to a surface; and
    (3) allowing the liquid solidfiable polyurethane composition to cure to form a polyurethane/geofabric composite.

2. The method according to claim 1, wherein COMPONENT A is polymethylene poly (phenylisocyanate).

3. The method according to claim 1, wherein COMPONENT B and COMPONENT C each have a number average molecular weight of from 400 to 4,000.

4. The method according to claim 1, wherein COMPONENT B and COMPONENT C each comprise from about 0.5 to about 5 wt. % of a compound containing at least two amine groups.

5. The method according to claim 1, wherein polyethers comprise the hydroxyl group containing compounds of both COMPONENT B and COMPONENT C.

6. The method according to claim 5, wherein the polyethers have no ethylene oxide units.

7. The method according to claim 1, wherein the catalyst of COMPONENT C is dimethyltin dilaurate.

8. The method according to claim 1, wherein the mix ratio of COMPONENT B to COMPONENT C is in the range of from 30:70 to 98:2.

9. The method according to claim 1, wherein the mix ratio of COMPONENT B to COMPONENT C is in the range of from 70:30 to 98:2.

10. The method according to claim 1, wherein the mix ratio of COMPONENT B to COMPONENT C is in the range of from 90:10 to 98:2.

11. The method according to claim 1, wherein liquid solidifiable polyurethane composition has an isocyanate index of from 140 to 90.

12. The method according to claim 1, wherein the polyurethane-impregnated geofabric is applied to an earthen surface.

13. The method according to claim 1, wherein the polyurethane-impregnated geofabric is applied to a cracked and/or broken concrete surface.

14. The method according to claim 1, wherein at least two polyurethane-impregnated geofabrics are conformed to a surface.

15. The method according to claim 1, wherein the polyurethane-impregnated geofabrics cure to form a layered polyurethane/geofabric composite.

16. A method for lining a ditch, canal and/or pipe comprising:
(1) impregnating at least one geofabric with a liquid solidifiable polyurethane composition to form a polyurethane-impregnated geofabric, the liquid solidifiable polyurethane composition being the reaction product of a mixture comprising:
COMPONENT A: a liquid polyisocyanate;
COMPONENT B: a first isocyanate reactive component which does not contain catalyst, optionally, further comprising: Bi) 0–10% by weight, based on the total weight of COMPONENT B, of one or more low molecular weight diols or triols having hydroxyl equivalent weights of from about 31 to 99; and Bii) 0–10% by weight, based on the total weight of COMPONENT B, of a compound containing at least two amine groups; and
COMPONENT C: a second isocyanate reactive component which has the same equivalent weight as COMPONENT B comprising 0.01 to 1% by weight, based on the total weight of COMPONENT B and COMPONENT C, of an organo-metal catalyst, optionally, further comprising: Ci) 0–10% by weight, based on the total weight of COMPONENT C, of one or more low molecular weight diols or triols having hydroxyl equivalent weights of from about 31 to 99; and Cii) 0–10% by weight, based on the total weight of COMPONENT C, of a compound containing at least two amine groups; and
wherein COMPONENT B and COMPONENT C are used in a mix ratio such that a geltime of from three to twenty minutes at a temperature between 4° C. and 50° C. is achieved;
(2) conforming at least one polyurethane-impregnated geofabric to a surface; and
(3) allowing the liquid solidifiable polyurethane composition to cure to form a polyurethane/geofabric composite.

17. The method according to claim 16, wherein at least two polyurethane-impregnated geofabrics are conformed to a surface of a ditch, canal and/or pipe.

18. The method according to claim 16, wherein the polyurethane-impregnated geofabrics cure to form a layered polyurethane/geofabric composite.

19. The method according to claim 16, wherein the mix ratio of COMPONENT B to COMPONENT C is in the range of from 30:70 to 98:2.

20. The method according to claim 16, wherein the mix ratio of COMPONENT B to COMPONENT C is in the range of from 70:30 to 98:2.

21. The method according to claim 16, wherein the mix ratio of COMPONENT B to COMPONENT C is in the range of from 90:10 to 98:2.

* * * * *